(12) United States Patent
Tanaka et al.

(10) Patent No.: US 8,284,171 B2
(45) Date of Patent: Oct. 9, 2012

(54) LIQUID CRYSTAL DISPLAY DEVICE WITH INPUT FUNCTION

(75) Inventors: Jun Tanaka, Kawasaki (JP); Shinji Sekiguchi, Kawasaki (JP); Norio Mamba, Kawasaki (JP)

(73) Assignees: Hitachi Displays, Ltd., Chiba (JP); Panasonic Liquid Crystal Displays Co., Ltd., Hyogo-ken (JP)

( * ) Notice: Subject to any disclaimer, the term of this patent is extended or adjusted under 35 U.S.C. 154(b) by 437 days.

(21) Appl. No.: 12/687,899

(22) Filed: Jan. 15, 2010

(65) Prior Publication Data

US 2010/0214260 A1    Aug. 26, 2010

(30) Foreign Application Priority Data

Feb. 24, 2009    (JP) .................................. 2009-040700

(51) Int. Cl.
*G09G 3/045* (2006.01)
(52) U.S. Cl. ........................................ 345/174; 345/173
(58) Field of Classification Search .................. 345/156, 345/173–175, 104; 178/18.01–18.07, 19.01–19.05
See application file for complete search history.

(56) References Cited

U.S. PATENT DOCUMENTS

| 2008/0122802 A1 | 5/2008 | Furuhashi et al. |
| 2009/0009487 A1 | 1/2009 | Nishitani et al. |

FOREIGN PATENT DOCUMENTS

| JP | 09-005763 | 1/1997 |
| JP | 10-073810 | 3/1998 |
| JP | 10-082998 | 3/1998 |
| JP | 10-170958 | 6/1998 |
| JP | 2002-040485 | 2/2002 |
| JP | 2002-296615 | 10/2002 |
| JP | 2006-023904 | 1/2006 |
| JP | 2008-032756 | 2/2008 |
| JP | 2008-070734 | 3/2008 |
| JP | 2008-134522 | 6/2008 |
| JP | 2008-185785 | 8/2008 |
| JP | 2008-186714 | 8/2008 |
| JP | 2008-225337 | 9/2008 |
| JP | 2009-15492 | 1/2009 |

*Primary Examiner* — Ricardo L Osorio (74) *Attorney, Agent, or Firm* — Antonelli, Terry, Stout & Kraus, LLP (57) ABSTRACT

In a liquid crystal display device having a built-in capacitive coupling touch sensor, a pair of facing transparent substrates sandwich a liquid crystal layer 113 and a liquid crystal display circuit for driving liquid crystal using a lateral electrical field having a color filter layer 107 is formed on one of the transparent substrates 101 in order to make the touch sensor highly sensitive to change in the capacitance, and a capacitive coupling touch sensor circuit layer 117 is formed on the other substrate 116, on the side opposite to the liquid crystal.

8 Claims, 7 Drawing Sheets

LIQUID CRYSTAL DISPLAY DEVICE WITH INPUT FUNCTION

CROSS-REFERENCE TO RELATED APPLICATION

The present application claims priority over Japanese Application JP2009-40700 filed on Feb. 24, 2009, the contents of which are hereby incorporated into this application by reference.

BACKGROUND OF THE INVENTION (1) Field of the Invention

The present invention relates to a liquid crystal display device with an input function, and in particular to a liquid crystal display device having a built-in capacitive coupling touch sensor function.

(2) Description of the Related Art

Capacitive coupling touch sensors are devices that are combined with display devices and have such a function as to detect the point where a touch sensor screen corresponding to the display region of the display device is touched with the finger by detecting the change in capacitance between the tip of the finger and a location detecting electrode, so that the coordinates of the point can be inputted into the display device.

In recent years touch sensors have been used in mobile apparatuses, such as cellular phones and microminiature personal computers, as input devices to be combined with the display device.

Capacitive coupling touch sensors are provided with a transparent electrode that is formed on the touch sensor screen on top of the touch sensor substrate corresponding to the display region of the display device and patterned so as to be able to detect the touched point, wires for taking out a location detecting signal from a transparent electrode formed around the periphery of the touch sensor screen, and a wire circuit for outputting a location detecting signal to an external detection circuit.

An example of a liquid crystal display device with a touch sensor made of a capacitive coupling touch sensor device and a liquid crystal display devices that are pasted together is given in JP2006-023904A.

Examples of capacitive coupling touch sensor functions that are built-in in liquid crystal display devices are given in JP2008-185785A, which relates to an in-plane switching driving mode liquid crystal display device, and JP2008-32756A, which relates to twisted nematic (TN) mode and vertical alignment liquid crystal display devices.

SUMMARY OF THE INVENTION

In recent years, there has been a lot of competition for developing thinner mobile apparatuses. Particularly, thinner cellular phones have been developed by reducing the thickness of the glass substrate of the liquid crystal panel and the backlight apparatus.

Liquid crystal display devices with a touch sensor made by pasting a capacitive coupling touch sensor device and a liquid crystal display device together are thick as a whole, because the substrate of the touch sensor and the substrate of the liquid crystal display device are pasted together.

In order to solve this problem, the circuit for the functions of the touch sensor is formed on the substrate on the liquid crystal display device side, so that the functions are built-in, and thus, the thickness of the liquid crystal display device can be reduced by the thickness of the substrate of the touch sensor. Such liquid crystal display devices are described in JP2008-185785A and JP2008-32756A.

The driving mode of liquid crystal display devices can be generally divided into the following three categories.

One is in-plane switching driving, where one of the pair of substrates that sandwich the liquid crystal has pixel electrodes for driving liquid crystal and a common electrode. The two others are TN and vertical alignment, where one substrate has pixel electrodes for driving liquid crystal on the surface on the liquid crystal side and the other has a common electrode formed on the surface on the liquid crystal side.

From among these, conventional in-plane switching driving mode liquid crystal display devices have a shield electrode layer and a conductive layer having a constant potential that are formed on the two facing surfaces of the substrates for the pixel electrodes and the common electrode for driving the liquid crystal.

In the case where an in-plane switching driving mode liquid crystal display device has conductors having a constant potential on the two facing surfaces of the substrates for pixel electrodes and a common electrode, an electrical field is generally not generated between the pixel electrodes and the common electrode, and thus, the movement of the liquid crystal molecules aligned due to the electrical field is affected, and the alignment of the liquid crystal is disturbed, which causes spots on the display, and therefore, the display performance is inferior. Materials having a high resistance value that can be used on the facing surfaces of the substrates are described in JP1997-5763A, JP1998-73810A, JP1998-82998A, JP1998-170958A and the like, and thus materials having a high resistance are used on the facing surfaces of the substrates.

Therefore, conventional in-plane switching driving mode liquid crystal displays have a problem, such that their performance as liquid crystal display devices is significantly inferior, due to the presence of a shield electrode layer or conductive layer having a constant potential on the two facing surfaces of the substrates for the pixel electrodes and the common electrode for driving an electrical field.

In addition, a shield electrode layer or a conductive layer and a color filter layer are formed on the rear surface of the substrate on which touch sensor electrodes are formed. Therefore, a process for forming a shield electrode layer or conductive layer and a color filter layer is necessary before or after the formation of the touch sensor electrodes, and thus, it is necessary to protect the front surface while forming layers on the rear surface, and there is a problem, such that the process becomes complicated.

Meanwhile, conventional TN and vertical alignment liquid crystal display devices have electrodes for driving liquid crystal formed on the surface on the liquid crystal side, so that liquid crystal is driven by the electrical field between the electrodes. In this structure, the capacitive coupling touch sensor electrodes and the electrodes for driving the liquid crystal are isolated from each other only by a color filter layer. As for the touch sensor function, the point on the liquid crystal panel screen touched by the finger is detected by detecting the change in the capacitance of the capacitor coupled with the finger through the touch sensor electrode, and thus, the point is reflected on the image display.

However, the screen is not that sensitive to the change in capacitance of the capacitor coupled with the finger when affected by the electrical field for driving the liquid crystal in the vicinity thereof, and thus, a problem arises, such that normal function is not possible as a touch sensor. In contrast, the electrical field generated between the electrodes for driving the liquid crystal in the vicinity thereof is disturbed by a current signal that flows through a touch sensor electrode in the vicinity, and as a result, the movement of the liquid crystal molecules that are aligned is affected, and the alignment of the liquid crystal is disturbed, causing a problem with the display performance.

An object of the present invention is to provide a liquid crystal display device having an incorporated capacitive coupling touch sensor function that is suitable for mass production while maintaining its function and performance as a touch sensor.

In order to achieve the above described object, the liquid crystal display device having an incorporated capacitive coupling touch sensor function according to the present invention has the following features.

The liquid crystal display device according to the present invention has switching elements made of thin film transistors that are aligned in a matrix, wire portions for the switching elements, transparent pixel electrodes that are electrically connected to the thin film transistors, and a common electrode that faces the pixel electrodes with an insulating film in between on one of the pair of transparent substrates that sandwich the liquid crystal, as well as a liquid crystal alignment film on the surface on the liquid crystal side and a liquid crystal alignment film on the surface of the other substrate on the liquid crystal side, as well as electrodes having a capacitive coupling touch sensor function on the other side.

Here, in the present liquid crystal display device, liquid crystal is driven and aligned horizontally to the electrodes by the lateral electrical field between the pixel electrodes and the common electrode, and thus, the device has an image displaying function.

In addition, the liquid crystal display device according to the present invention has a pair of transparent substrates which sandwich liquid crystal, and a color filter on the side of the substrate having thin film transistors, and thus, color display is possible. The other substrate has a liquid crystal alignment film on the surface on the liquid crystal side and a touch sensor circuit for detecting the touched point in accordance with a capacitive coupling method using XY coordinate electrodes made of transparent electrodes provided on the rear surface.

Here, the substrate having a touch sensor circuit has only a liquid crystal alignment film on one side, and there is no conductive layer to affect the lateral electrical field for driving the liquid crystal, and as a result, display is possible without the movement of the aligned liquid crystal molecules being disturbed by the electrical field.

In the case where a liquid crystal alignment film and cell gap spacers are formed on one side (the cell gap spacers function the same even when they are on the side of the substrate having a thin film transistor circuit), it becomes possible to make the manufacturing process simple while maintaining the basic performance as a liquid crystal display device.

Furthermore, when the thickness of the substrate having a touch sensor circuit is 0.4 mm or more and 1.2 mm or less, the substrate is sufficiently thick as an insulator, so that the touch sensor circuit can be isolated from the lateral electrical field for driving the liquid crystal by the substrate itself, making the touch sensor circuit highly sensitive to change in the capacitance of the capacitor between the touch sensor electrode and the finger.

The present invention can provide a liquid crystal display device having an incorporated capacitive coupling touch sensor function that is suitable for mass production while maintaining its function and performance as a touch sensor.

EXPLANATION OF SYMBOLS

101 . . . first substrate, 102 . . . gate electrode, 103 . . . insulating layer, 104 . . . source electrode, 105 . . . thin film transistor, 106 . . . drain electrode, 107 . . . color filter layer, 108 . . . transparent common electrode, 109 . . . insulating layer, 110 . . . pixel electrode, 111 . . . opening for connection, 112 . . . liquid crystal alignment film, 113 . . . liquid crystal layer, 114 . . . cell gap spacer, 115 . . . liquid crystal alignment film, 116 . . . second substrate, 117 . . . touch sensor circuit layer, 118, 119 . . . external polarizing plate, 201 . . . drain electrode, 202 . . . gate electrode, 203 . . . thin film transistor, 204 . . . source electrode, 205 . . . opening for connection, 206 . . . transparent pixel electrode, 207 . . . slit in pixel electrode, 208 . . . transparent common electrode, 301 . . . opening for connection, 302 . . . transparent pixel electrode, 303 . . . slit in pixel electrode, 304 . . . transparent common electrode layer, 305 . . . color filter (red), 306 . . . color filter (green), 307 . . . color filter (blue), 401 . . . first substrate, 402 . . . liquid crystal layer, 403 . . . second substrate (with built-in touch sensor circuit), 404 . . . image display screen (touch-sensor screen), 405 . . . IC for controlling touch point detecting circuit, 406 . . . flexible printed wiring board, 407 . . . flexible printed wiring board, 408 . . . IC for controlling liquid crystal display, 501 . . . external polarizing plate, 502 . . . first substrate, 503 . . . liquid crystal sealing portion, 504 . . . liquid crystal layer, 505 . . . second substrate, 506 . . . touch sensor circuit layer, 507 . . . external polarizing plate, 601 . . . second substrate, 602 . . . image display screen (touch sensor screen), 603 . . . touch point coordinate detecting transparent electrode (for X coordinate), 604 . . . touch point coordinate detecting transparent electrode (for Y coordinate), 605 . . . electrode circuit signal wire, 606 . . . touch sensor circuit connection terminal, 701 . . . second substrate, 702 . . . touch point coordinate detecting circuit layer, 703 . . . touch point coordinate detecting transparent electrode, 704 . . . insulating film, 705 . . . touch point coordinate detecting transparent electrode, 706 . . . insulating film

DESCRIPTION OF THE PREFERRED EMBODIMENTS

In the following, the embodiments of the present invention are described in reference to FIGS. 1 to 7.

First Embodiment

Figure 1:
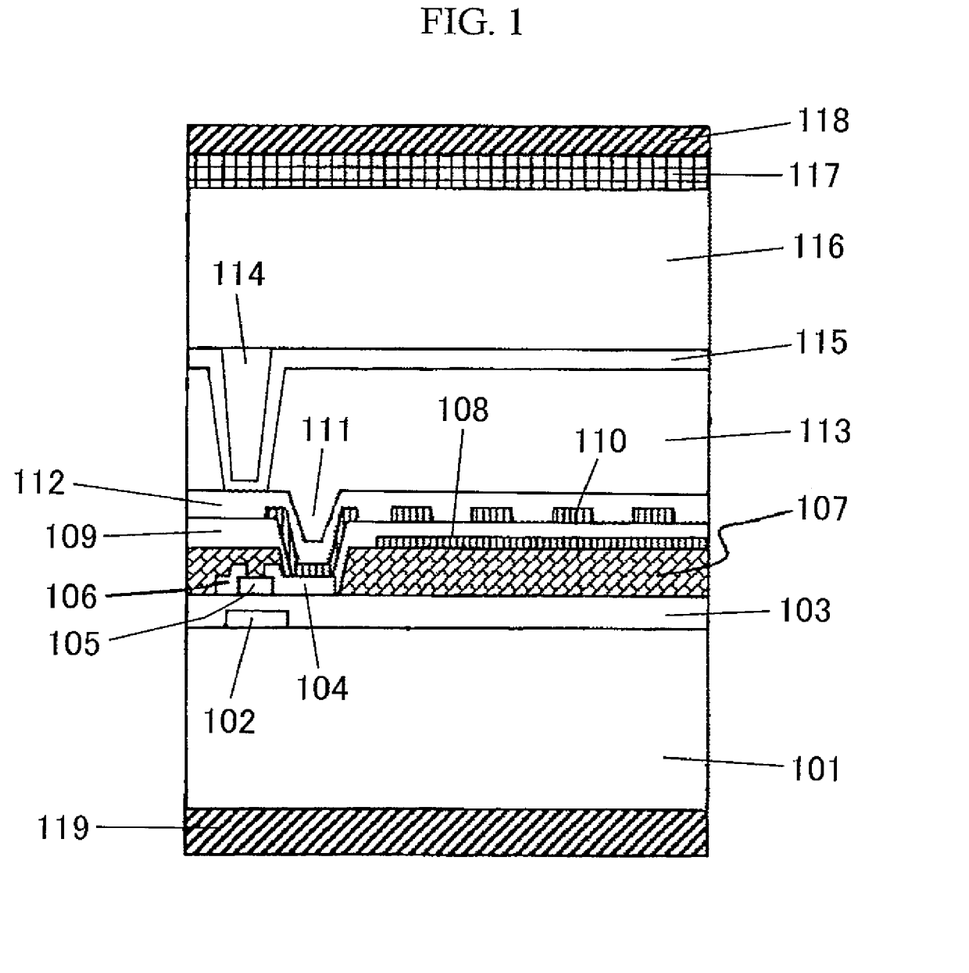
FIG. 1 is a cross sectional diagram showing a liquid crystal display device according to an embodiment of the present invention.

The liquid crystal display device according to the first embodiment shown in the cross sectional diagram of FIG. 1 was fabricated under the following conditions.

In the liquid crystal display device according to the present embodiment, a first substrate 101 and a second substrate 116 which are facing transparent substrates sandwich a liquid crystal layer 113, and a display circuit having a thin film transistor circuit as a switching element is provided on the first substrate 101.

Conductive gate electrodes 102 having a desired pattern are formed on the first substrate 101 and an insulating layer 103 is formed of a nitride silicon film on top. Next, thin film transistors 105 are formed, and source electrodes 104 and drain electrodes 106 are formed so as to be connected to these. Next, a color filter layer 107 is formed of a pigment color filter material. At this time, openings for connection 111 that extend to the source wires are created in the color filter layer. Next, a transparent common electrode 108 is formed. Then, an insulating layer 109 is formed of a silicon nitride film on top. At this time, openings for connection 111 that extend to the source wires are created in the insulating layer 109. Next, a transparent pixel electrode 110 that is patterned to a desired form is formed. At this time, the pixel electrode 110 is connected to the source electrodes 104 through the openings for connection 111. Next, an alignment film 112 for liquid crystal having a polyimide material as the main component is formed.

A capacitive touch sensor circuit layer 117 is formed on the second substrate 116. Cell gap spacers 114 for determining the thickness of the liquid crystal layer 113 are formed on the rear surface (on the liquid crystal side). Next, an alignment film 115 for liquid crystal having a polyimide material as the main component is formed.

After the liquid crystal layer 113 is sandwiched with the first substrate 101 and the second substrate 111, polarizing plate films are pasted on the outside of the substrates so that external polarizing plates 118 and 119 are formed.

The thus formed cell holding liquid crystal and a backlight unit that becomes a light source (not shown) are combined into a liquid crystal display device.

In the following, the manufacturing process is concretely described.

Non-alkali glass having a thickness of approximately 0.4 mm that is highly transparent to visible light is used for the first substrate 101, and a film of an electrode material that becomes gate electrodes is formed on top and patterned in accordance with a photolithographic technology using a photoresist, and thus, gate electrodes 102 are formed. In the present example of the structure, aluminum and molybdenum are layered in sequence in accordance with a sputtering method to form gate electrodes 102 having a thickness of approximately 100 nm.

Next, a silicon nitride film having a thickness of approximately 300 nm is formed as an insulating layer 103 in accordance with a plasma CVD (chemical vapor deposition) method over the entire surface of the substrate so as to cover the gate electrodes 102. Furthermore, thin film transistors 105 are formed on the gate electrodes in accordance with a photolithographic technology with a silicon nitride insulating film in between. In the present example of the structure, the thin film transistors 105 are formed of an amorphous silicon film or polycrystal silicon film and have a thickness of approximately 300 nm.

Next, source electrodes 104 and drain electrodes 106 are formed so as that part thereof overlaps with the pattern of the thin film transistors. These are formed so as to have a thickness of approximately 300 nm, by layering molybdenum, aluminum, and then molybdenum again in sequence in accordance with a sputtering method. Next, a photoresist is patterned using a well-known photolithographic technology, and the thus gained photoresist pattern is used as a mask for etching to form electrodes through patterning, and the photoresist is then removed, so that source electrodes and drain electrodes are formed in a desired pattern.

Next, an alkali developer photosensitive color filter material containing a color filter pigment is applied in accordance with a spinning or slit method and heated to 90° C. using a hot plate or an oven, and then exposed to light in accordance with a photolithographic technology using a predetermined photo mask, so that the material is patterned in an alkali developer and openings for connection 11 are created. Next, the material is heated for 30 minutes at 230° C. in an oven so as to be cured, and thus, a color filter layer 107 having a thickness of approximately 1.5 μm is formed. It is necessary to combine pigments of three colors: red, green and blue, for color display, and therefore, three different color filters are formed.

Next, an indium tin oxide film is formed in a vacuum in accordance with a well-known sputtering method so as to have a thickness of 70 nm. Next, a photoresist is applied using a well-known photolithographic technology, and a desired pattern is formed through exposure to light and development. The thus gained photoresist pattern is used as a mask for etching, so that the film is patterned into a transparent electrode, and the photoresist is removed and a desired pattern of a transparent common electrode 108 gained.

In addition to indium tin oxide films having a relatively high conductivity that allow visible light to transmit, transparent oxide electrodes, for example indium oxide zinc oxide films or zinc oxide, are also appropriate for the transparent electrode. The thickness of the electrode is determined by the relationship between the conductivity and the transparency. An acid liquid may be used to etch the transparent oxide electrode film.

Next, an insulating layer 109 for covering and protecting the films in the lower layer is formed in an upper layer. In the case of the present example of the structure, a silicon nitride film having a thickness of approximately 500 nm is formed in accordance with a plasma CVD method. In addition, silicon nitride oxide films can also be used. At this time, it is desirable for the temperature to be room temperature or higher and 280° C. or lower, in order to form a silicon nitride film or silicon nitride oxide film, and a temperature of 180° C. or higher and 230° C. or lower is particularly desirable, taking the heat resistance of the pigment color filters and the physical properties of the silicon nitride film or silicon nitride oxide film as a protective film into consideration.

Next, a photoresist material is applied and heated to 90° C. using a hot plate or an oven, and then exposed to light in accordance with a photolithographic technology using a predetermined photomask, so that the material is patterned in an alkali developer and openings are created so as to expose the silicon nitride film in the layer beneath the resist. Next, the resist is used as a mask and exposed portions of the silicon nitride film are removed through etching, so that openings for connection 111 from which the source electrodes in the lower layer are exposed are created. At this time, the silicon nitride film covers the color filter layer, and thus, the color filter layer is not exposed from the openings for connection 111.

Next, an indium tin oxide film is formed in a vacuum in accordance with a well-known sputtering method so as to have a thickness of 70 nm. Next, a well-known photolithographic technology is used to apply a photoresist and a desired pattern is formed though exposure to light and development. The thus gained photoresist pattern is used as a mask for etching, so that the film is patterned into transparent electrodes, and the photoresist is removed, so that transparent pixel electrodes 110 in a desired pattern are gained.

Next, a liquid crystal alignment film 112 for aligning liquid crystal is formed on the surface in the display region of the liquid crystal display device. The liquid crystal alignment film is formed of a polyimide based material solution through flexographic printing or in accordance with an inkjet application method, and heated to 90° C., followed by curing through heating at 230° C., and after that, a rubbing process is carried out on the surface of the film, which is then washed with water and an alignment film is gained.

Glass substrates that are highly transparent to visible light made of non-alkali glass, alkali glass, for example soda glass or borosilicate glass, or chemically reinforced glass, may be used for the second substrate 116. In addition, polyester films made of polyethylene terephthalate or polyethylene naphthalate, which are transparent, and polyimide films that are highly heat resistant and highly transparent are also known, and these transparent resin based substrates may also be used.

It is desirable for the thickness of the substrate to be 0.4 mm or more and 1.2 mm or less. At this time, the second substrate 116 becomes sufficiently thick as an insulator between the liquid crystal display device and the capacitive touch sensor circuit layer.

Here, non-alkali glass having a thickness of 0.8 mm is used as the second substrate 116, and a capacitive touch sensor circuit layer 117 is formed.

A circuit is formed in the capacitive touch sensor circuit layer 117 using transparent electrodes within the display screen. Indium tin oxide films having a relatively high conductivity that allow visible light to transmit, and transparent oxide electrodes, for example indium oxide zinc oxide films or zinc oxide, are also appropriate for the transparent electrodes. The transparent electrodes can be made of an indium tin oxide film, for example, formed in a vacuum in accordance with a well-known sputtering method. Next, a photoresist is applied in accordance with a well-known photolithographic technology, exposed to light and developed, so that a desired pattern is formed. The thus gained photoresist pattern is used as a mask for etching, so that the film is patterned into transparent electrodes, and the photoresist is removed, so that transparent electrodes in a desired pattern are gained. The thickness of the electrodes is determined by the relationship between the conductivity and the transparency.

Cell gap spacers 114 for determining the thickness of the liquid crystal layer 113 are formed on the rear surface of the second substrate 116 (on the liquid crystal side).

Photosensitive materials are appropriate for the cell gap spacers. Positive photosensitive materials which dissolve in a developer and removed when irradiated with light, and negative photosensitive materials which dissolve in a developer and removed when not irradiated with light are known as photosensitive materials gained by combining a photosensitive agent with an acryl based resin or an acryl epoxy based resin which is a base polymer, and it is possible to use these. An alkali solution or organic solvent may be used as the developer, depending on the photosensitive material.

A solution of such a photosensitive material is applied in accordance with a spinning or slit method and heated to 90° C. using a hot plate or an oven and exposed to light in accordance with a photolithographic technology using a predetermined photo mask, so that a pattern is formed in the developer. Next, the material is cured through heating for 30 minutes at 230° C. in an oven, and thus, the cell gap spacers 114 are formed.

Next, a liquid crystal alignment film 115 for aligning the liquid crystal is formed on the surface in the display region of the liquid crystal display device. The liquid crystal alignment film 115 is formed of a polyimide based material solution through flexographic printing or in accordance with an inkjet application method, and heated to 90° C., followed by curing through heating at 230° C., and after that, a rubbing process is carried out on the surface of the film, which is then washed with water and an alignment film is gained.

The thus formed first substrate and second substrate are pasted together so as to hold the liquid crystal layer 113 in between. The thickness of the liquid crystal layer is determined by the height of the cell gap spacers 114. Here, it is 0.4 μm.

Next, polarizing plate films are pasted to the outside of the first substrate and the second substrate, so that external polarizing plates 118 and 119 are provided.

Thus, a liquid crystal display device having a built-in capacitive coupling touch sensor function is gained. In the present liquid crystal display device, switching elements made of thin film transistors aligned in a matrix, wire portions for the switching elements, transparent pixel electrodes that are electrically connected to the source electrodes of the thin film transistors, and a common electrode that faces the pixel electrodes with an insulating film in between are provided on one of a pair of facing transparent substrates hold liquid crystal in between, liquid crystal alignment films are provided on the surfaces between which the liquid crystal is held, and electrodes having a capacitive coupling touch sensor function are provided on the rear surface of the other substrate.

The present liquid crystal display device has an image displaying function which allows liquid crystal to be driven and aligned horizontally relative to the electrodes through lateral electrical fields between pixel electrodes and the common electrode, and in addition, the liquid crystal display device has a color display thanks to the color filters on the side of the substrate having thin film transistors. Though in the present embodiment, the color filter layer 107 is formed on the insulating layer 103, the color filter layer 107 may be provided anywhere on the side of the substrate having the thin film transistors 105. For example, the color filter layer 107 may be formed on the first substrate 101 and a protective film formed on top using a silicon nitride film or a silicon nitride oxide film, and after that gate electrodes 102 and an insulating layer 103 formed on top.

Figure 2:
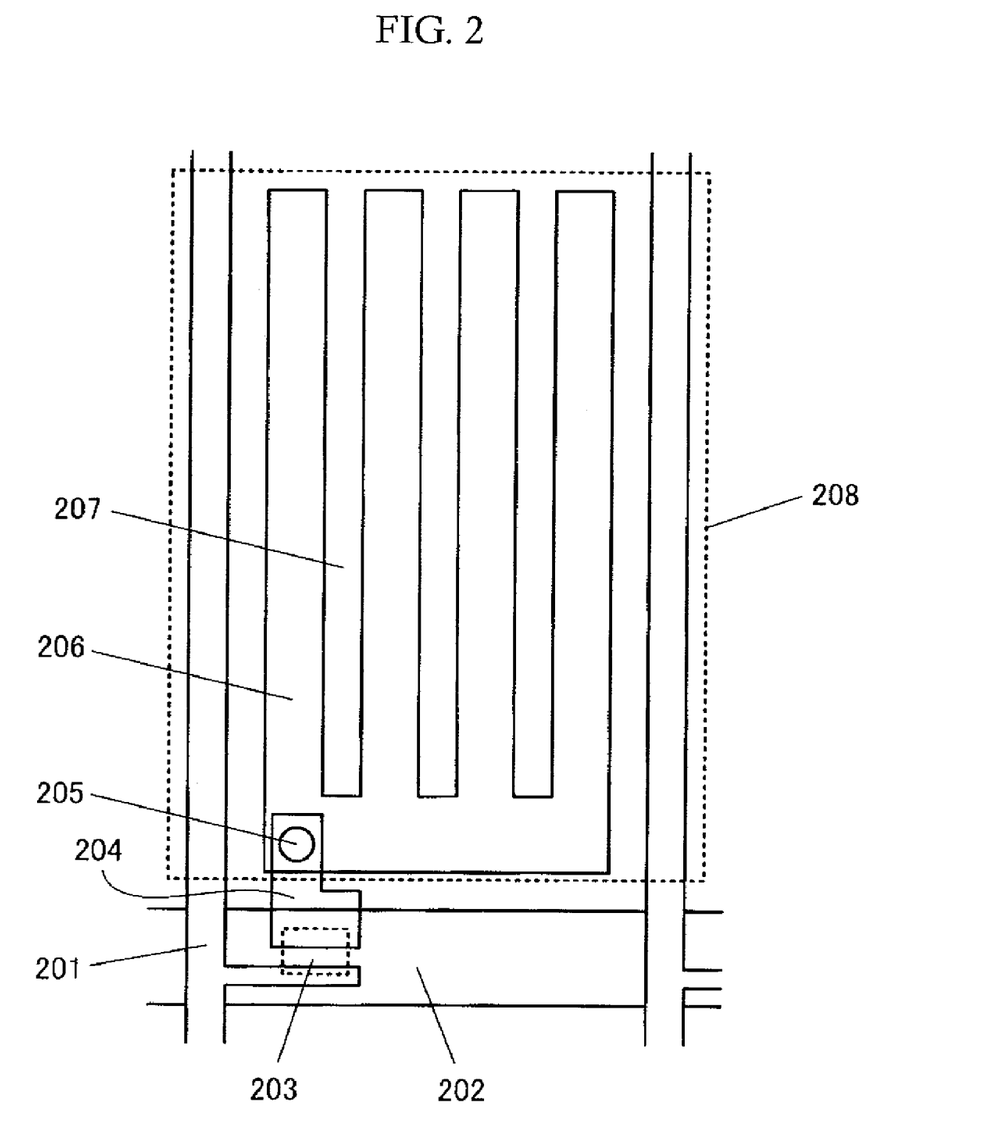
FIG. 2 is a plan diagram showing a pixel circuit on the first substrate of the liquid crystal display device according to an embodiment of the present invention.

Here, the display circuit using the thin film transistor circuit formed on the first substrate 101 as a switching element is formed of drain electrodes 201, gate electrodes 202, thin film transistors 203, source electrodes 204, openings for connection 205, transparent pixel electrodes 206 and transparent common electrodes 208, as shown in the plan diagram of FIG. 2, which shows one sub-pixel in a liquid crystal display pixel. The transparent pixel electrodes 206 are in comb tooth form with slits 207 in the pixel electrode, so that the liquid crystal can be aligned horizontally relative to the electrode using the lateral electrical field between the transparent pixel electrodes and the transparent common electrodes 208. The transparent pixel electrodes 206 may be referred to as electrodes in comb tooth form because of their form.

Figure 3:
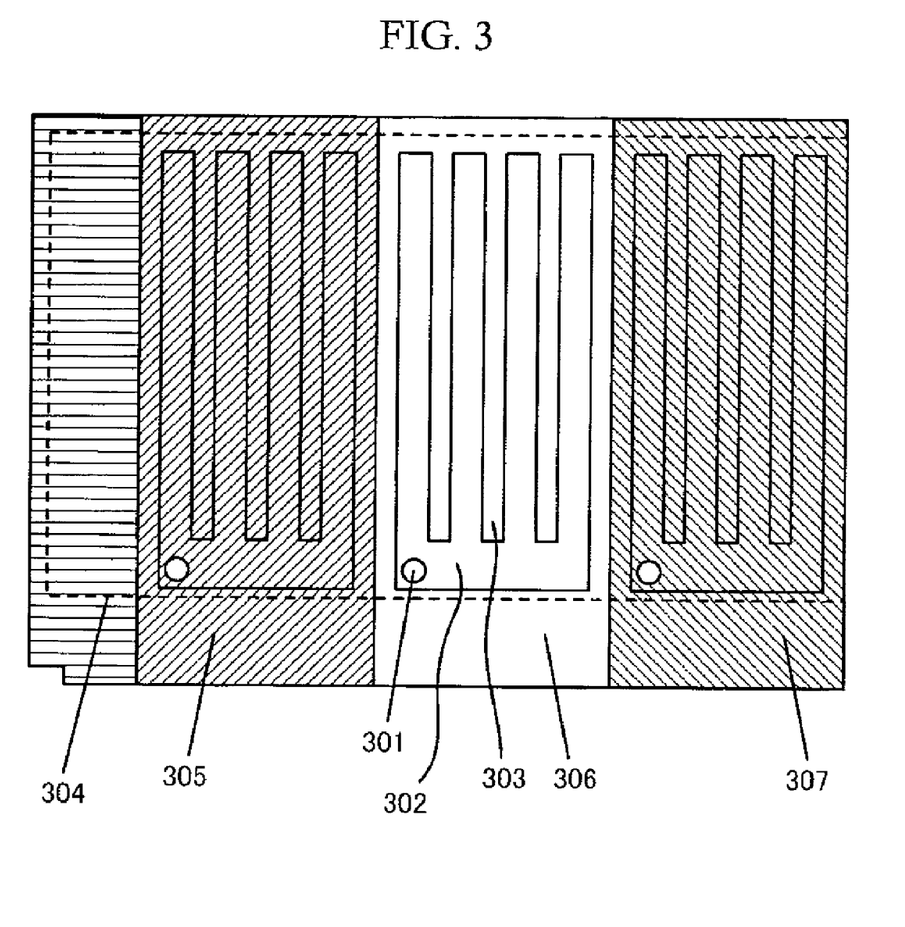
FIG. 3 is a plan diagram showing a color filter on the first substrate of the liquid crystal display device according to an embodiment of the present invention.

In addition, the display circuit using the thin film transistor circuit on the first substrate as a switching element makes color display possible in liquid crystal display devices where image pixels are made of sub-pixels for three primary color filters: red, green and blue, as shown in the plan diagram of FIG. 3.

In FIG. 3, 301 is an opening for connection, 302 is a transparent pixel electrode, 303 is a slit in the pixel electrode, 304 is a transparent common electrode layer, 305 is a color filter (red), 306 is another color filter (green), and 307 is still another color filter (blue).

Second Embodiment

Figure 4:
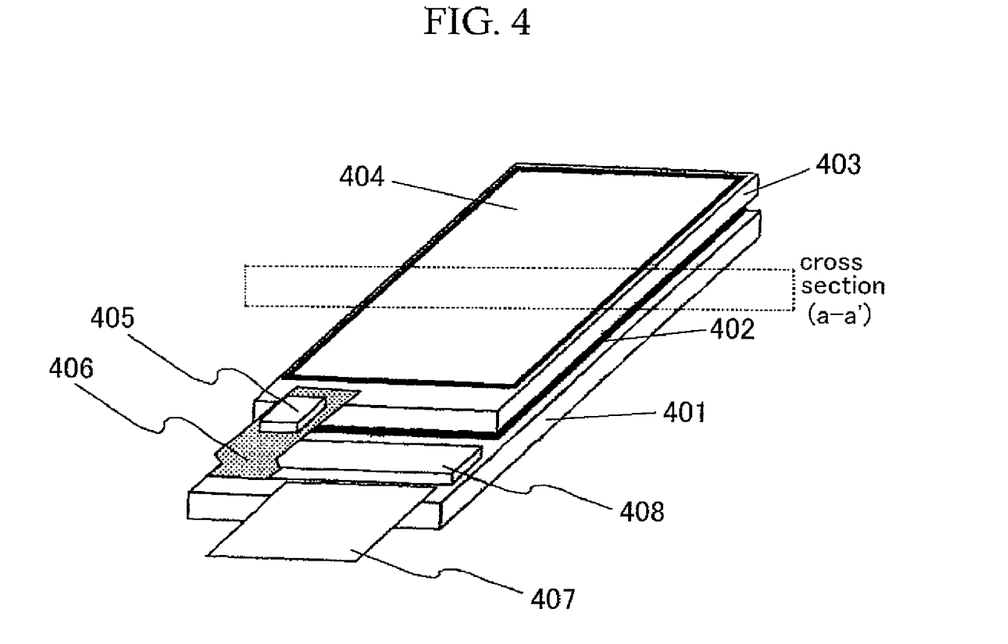
FIG. 4 is a perspective diagram showing the liquid crystal display device according to an embodiment of the present invention.

FIG. 4 is a perspective diagram showing the liquid crystal display device having a built-in capacitive coupling touch sensor function according to the first embodiment. The liquid crystal display device in FIG. 4 was fabricated under the following conditions.

A first substrate 401 on which a display circuit having a thin film transistor circuit as a switching element is formed and a second substrate 403 having a built-in touch sensor circuit are pasted together with the image display screen (touch sensor screen) 404 facing outward so as to hold a liquid crystal layer 402 in between. Polarizing plate films (not shown) are pasted outside the first substrate 401 and the second substrate 402.

A flexible printed wiring board 406 on which an IC for controlling a touch sensor location detecting circuit 405 is mounted is connected to the second substrate 403. This flexible printed wiring board 406 is connected to the first substrate 401 so that signals can be inputted in the liquid crystal display device. An IC for controlling the liquid crystal display 408 is mounted on the first substrate 401, to which a flexible printed wiring board 407 is connected. When the flexible printed wiring board 407 is connected to a signal circuit of a cellular phone, for example, it functions to send a display image signal to the liquid crystal display device.

Figure 5:
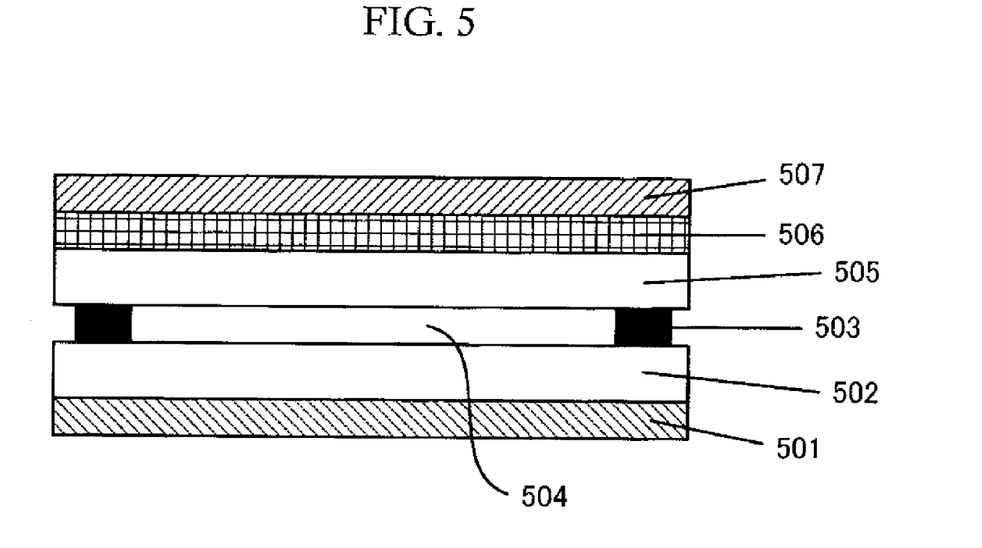
FIG. 5 is a cross sectional diagram showing the liquid crystal display screen along a-a' in FIG. 4 and illustrating the liquid crystal display device according to an embodiment of the present invention.

At this time, as shown in the cross section a-a' of FIG. 5, the first substrate 502, the liquid crystal sealing portion 503 for sealing the liquid crystal layer 504 around the periphery of the display screen, the second substrate 505, the touch sensor circuit layer 506 and external polarizing plates 501 and 507 that are pasted outside the two substrates are formed.

Thus, a liquid crystal display device having a built-in capacitive coupling touch sensor function is gained. In the present liquid crystal display device, switching elements made of thin film transistors aligned in a matrix, wire portions for the switching elements, transparent pixel electrodes that are electrically connected to the source electrodes of the thin film transistors, and a common electrode that faces the pixel electrodes with an insulating film in between are provided on one of a pair of facing transparent substrates hold liquid crystal in between, liquid crystal alignment films are provided on the surfaces between which the liquid crystal is held, and a capacitive coupling touch sensor circuit layer is provided on the rear surface of the other substrate (on the side opposite to the liquid crystal).

Third Embodiment

Figure 6:
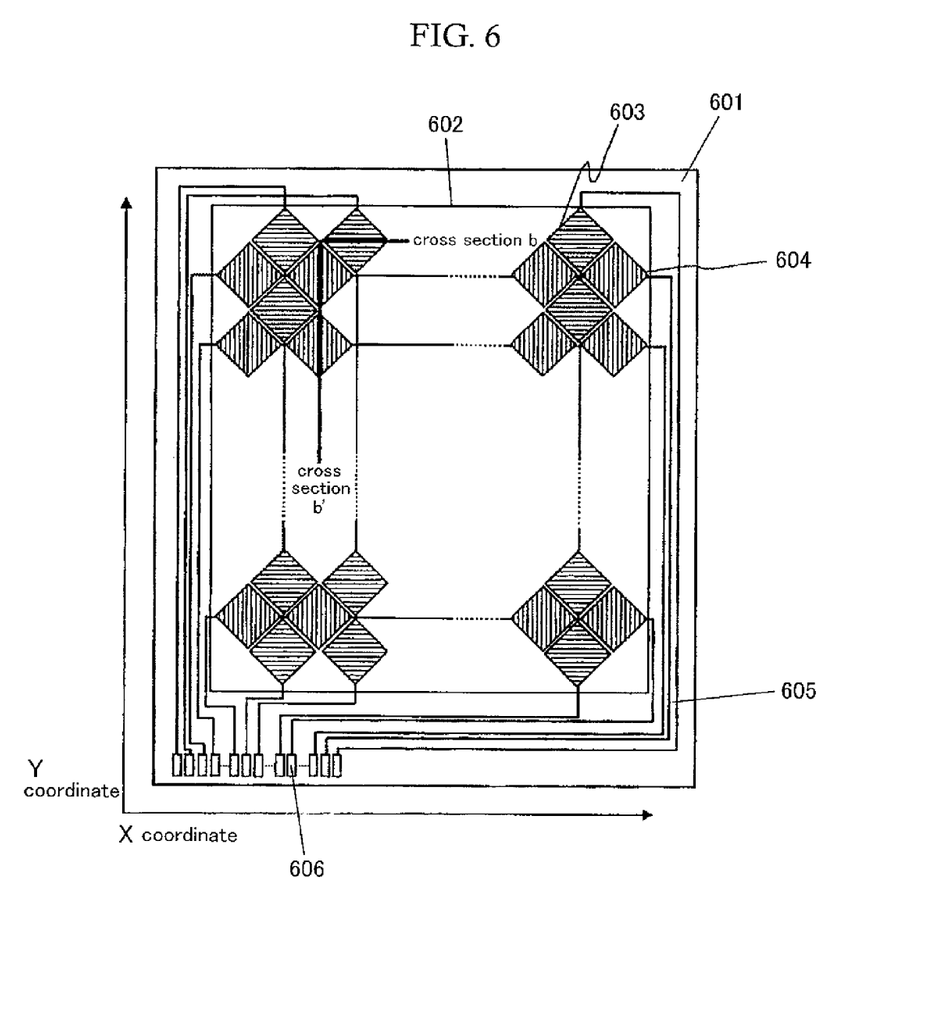
FIG. 6 is a plan diagram showing the substrate and illustrating the touch sensor circuit according to an embodiment of the present invention.

FIG. 6 is a plan diagram showing the touch sensor circuit layer on a substrate according to the first embodiment. The touch sensor circuit layer in FIG. 6 was fabricated under the following conditions.

A touch point coordinate detecting circuit layer for detecting the coordinates is formed on one side of the second substrate 601. This circuit layer is provided with touch point coordinate detecting transparent electrodes 603 and 604 (for detecting the X coordinate and the Y coordinate of the touched point, respectively) on the image display screen (touch sensor screen) 602 and electrode circuit signal wires 605 for outputting a signal from the transparent electrodes on the outside of the image display screen. The electrode circuit signal wires 605 are connected to touch sensor circuit connecting terminals 606 and the flexible printed wiring board 406 according to the second embodiment is connected through these connection terminals.

In the following, the manufacturing process is concretely described.

Non-alkali glass having a thickness of 0.8 mm is used for the second substrate 601.

Indium tin oxide films having a relatively high conductivity that allow visible light to transmit and transparent oxide electrodes, for example indium oxide zinc oxide films or zinc oxide, are appropriate for the transparent electrodes, which becomes coordinate electrodes 603 and 604. The thickness of the coordinate electrodes is determined by the relationship between the conductivity and the transparency. In addition, the form of the coordinate electrodes can be set so that the detection circuit can detect location signals from the ratio of the capacitive coupling signal to noise with high accuracy. The coordinate electrodes 603 and 604 correspond to the X coordinate and the Y coordinate in the touch panel apparatus, respectively. The positional relationship between the two in terms of which is on top and which is on the bottom is of no importance.

The transparent electrodes that become coordinate electrodes 603 and 604 are formed of an indium tin oxide film having a thickness between 5 nm and 50 nm in a vacuum in accordance with a well-known sputtering method. Next, a photoresist is applied, exposed to light and developed in accordance with a well-known photolithographic technology so that coordinate electrodes in a desired pattern are formed. The thus gained photoresist pattern is used as a mask for etching, so that the film is patterned into transparent electrodes, and the photoresist is removed, so that coordinate electrodes 603 and 604 made of transparent electrodes in a desired pattern are gained.

Electrode circuit signal wires 605 and touch sensor circuit connecting terminals 606 are formed of a highly conductive metal wire material, for example silver, aluminum or aluminum palladium copper, which is a metal compound, in accordance with a photolithographic technology, as described above, and patterned.

Figure 7:
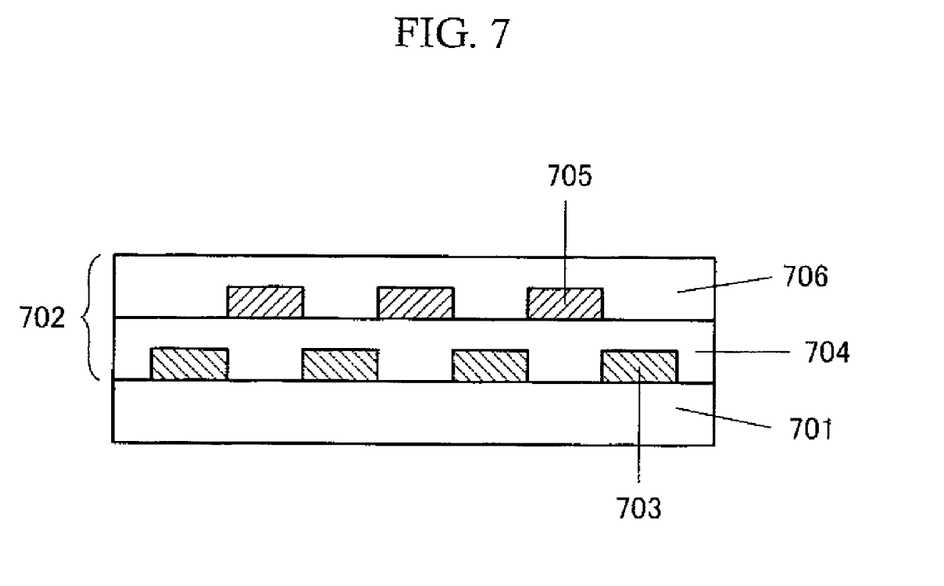
FIG. 7 is a cross sectional diagram showing the touch sensor circuit along b-b' in FIG. 6 and illustrating the touch sensor circuit according to an embodiment of the present invention.

At this time, the transparent electrodes, which become the coordinate electrodes 603 and 604 are insulated by insulating films 704 and 706, as shown in FIG. 7. In FIG. 7, 701 is the second substrate, 702 is a touched point coordinate detecting circuit layer, 703 is a touched point coordinate detecting transparent electrode, 704 is an insulating film, 705 is a touched point coordinate detecting transparent electrode, and 706 is an insulating film. A light transmitting insulating film material is appropriate for the insulating films 704 and 706. The film thickness can be determined taking the light transmittance and the dielectric constant of the insulating film material into consideration. In the case where the insulating films have a relative dielectric constant of 3 to 4, it is appropriate for the film to have a thickness of 1 to 20 μm.

A photosensitive material is appropriate for the insulating films, because openings are created when the above described touch point coordinate detecting circuit layer 702 is formed. Positive photosensitive materials which dissolve in a developer and removed when irradiated with light, and negative photosensitive materials which dissolve in a developer and removed when not irradiated with light are known as photosensitive materials gained by combining a photosensitive agent with an acryl based resin, an acryl epoxy based resin or a siloxane based resin which is a base polymer, and it is possible to use these. An alkali solution or organic solvent may be used as the developer, depending on the photosensitive material.

It is necessary for the insulating films to have a light transmittance of 80% or more in order to prevent the performance of the image display device from lowering. The above described insulating film material allows light to transmit when such components as the base polymer and the light sensitive agent absorb little visible light (400 nm to 800 nm) in the case of a negative photosensitive material. In the case of a positive photosensitive material, it is possible to increase the transmittance to visible light when the base polymer absorbs little visible light and a photo bleaching process is carried out on the photosensitive agent.

Concretely, it is possible to form the touch point coordinate detecting circuit layer 702 through the following process.

An indium tin oxide film having a thickness of 20 nm is formed on the second substrate 701 in accordance with a sputtering method. Next, a photoresist is applied, exposed to light and developed in accordance with a well-known photolithographic technology and patterned so that the indium tin oxide in the lower layer is exposed. Then, the photoresist pattern is used as a mask for etching, so that the exposed indium tin oxide is removed using hydrobromic acid. Next, the photoresist is removed, so that desired touch point coordinate detecting transparent electrodes 703 are gained.

The following steps are necessary for forming an insulating film layer in the case where an acryl based negative photosensitive material that can be developed using an alkali solution is used. First, a material solution is applied on the second substrate 701, where touch point coordinate detecting transparent electrodes 703 are formed. Next, a prebaked film is gained through heating for 5 minutes at 90° C. using a hot plate. Next, the surface of the insulating film is irradiated with light, excluding in portions where openings are to be created, and photo cured using a photo mask for forming a desired pattern. Next, an alkali solution containing 2.38 weight % of tetramethyl ammonium hydroxide is used to develop the prebaked film, so that portions that are not irradiated dissolve and are removed and desired openings can be created in the insulating film. Thus, an insulating film 704 having a thickness of 2 μm is gained when cured through heating for 10 minutes at 230° C. using a hot plate.

Next, an indium tin oxide film having a thickness of 20 nm is formed on top of the second substrate 701 in accordance with a sputtering method so as to cover the insulating film 704. Next, a photoresist is applied, exposed to light and developed in accordance with a well-know photolithographic technology and patterned so that the indium tin oxide in the lower layer is exposed. Next, the photoresist pattern is used as a mask, so that the exposed indium tin oxide is etched and removed in hydrobromic acid. Next, the photoresist is removed and desired touch point coordinate detecting transparent electrodes 705 are gained.

Next, an acryl based negative photosensitive material solution that can be developed using an alkali solution is applied on the substrate where a coordinate electrode layer is formed in the lower layer. Next, a prebaked film is gained through heating for 5 minutes at 90° C. using a hot plate. Next, the surface of the insulating film is irradiated with light, excluding in portions where openings are to be created, and photo cured using a photo mask for forming a desired pattern. Next, an alkali solution containing 2.38 weight % of tetramethyl ammonium hydroxide is used to develop the prebaked film, so that portions that are not irradiated dissolve and are removed and desired openings can be created in the insulating film. Thus, an insulating film 706 having a thickness of 2 μm is gained when cured through heating for 10 minutes at 230° C. using a hot plate.

What is claimed is:

1. A liquid crystal display device having a built-in capacitive coupling touch sensor, comprising a first transparent substrate and a second transparent substrate which sandwich liquid crystal, wherein
    switching elements made of thin film transistors aligned in a matrix,
    wire portions for the switching elements,
    transparent pixel electrodes that are electrically connected to the thin film transistors,
    a common electrode that faces the pixel electrodes with an insulating film in between,
    a color filter layer for a color display, and
    a liquid crystal alignment film on the surface on the liquid crystal side are provided on said first transparent substrate,
    transparent electrodes for said capacitive coupling touch sensor is formed on the surface of said second transparent substrate on the side opposite to said first transparent substrate, and
    a liquid crystal alignment film on the side opposite to said transparent electrodes is provided on the surface of said second transparent substrate on the other side.

2. The liquid crystal display device having a built-in capacitive coupling touch sensor according to claim 1, wherein an image is displayed by driving said liquid crystal using an electrical field between a pixel electrode and said common electrode provided on said first transparent substrate.

3. The liquid crystal display device having a built-in capacitive coupling touch sensor according to claim 1, wherein the transparent electrodes of said capacitive coupling touch sensor are made of XY coordinate electrodes on said second transparent substrate so that a touched point can be detected by an XY coordinate electrode in accordance with a capacitive coupling method and an image can be displayed through said second transparent substrate and said XY coordinate electrodes.

4. The liquid crystal display device having a built-in capacitive coupling touch sensor according to claim 1, wherein
    said pixel electrodes and said common electrode are provided above said color filter on said first substrate, and
    said common electrode is formed on top of said color filter layer on said first transparent substrate, and
    said pixel electrodes are provided so as to face said common electrode with an insulating film in between.

5. The liquid crystal display device having a built-in capacitive coupling touch sensor according to claim 1, wherein the liquid crystal alignment film on said second substrate is formed directly on the surface of said second transparent substrate on the side opposite to the side where the transparent electrodes of said touch sensor are formed.

6. A method for manufacturing a liquid crystal display device having a built-in capacitive coupling touch sensor, comprising the steps of
    forming switching elements of thin film transistors, wire portions for the switching elements, a color filter layer for color display, transparent pixel electrodes that are electrically connected to the thin film transistors, a common electrode that faces the pixel electrodes with an insulating film in between, and a liquid crystal alignment film on a first transparent substrate;

forming transparent electrodes for the capacitive coupling touch sensor on one side of said second transparent substrate and a liquid crystal alignment film on the other side of said second transparent substrate; and pasting said first transparent substrate and said second transparent substrate together with liquid crystal in between.

7. The method for manufacturing a liquid crystal display device having a built-in capacitive coupling touch sensor according to claim 6, wherein the liquid crystal alignment film is formed on said second substrate after the formation of the transparent electrodes of said capacitive coupling touch sensor on said second transparent substrate.

8. The method for manufacturing a liquid crystal display device having a built-in capacitive coupling touch sensor according to claim 6, wherein the liquid crystal alignment film is formed directly on said second substrate.

* * * * *